(12) United States Patent
Bermudez

(10) Patent No.: US 6,253,638 B1
(45) Date of Patent: Jul. 3, 2001

(54) BICYCLE SPROCKET CRANK

(76) Inventor: David Bermudez, 149 Cuba Hill Rd., Huntington, NY (US) 11743

( * ) Notice: Subject to any disclaimer, the term of this patent is extended or adjusted under 35 U.S.C. 154(b) by 0 days.

(21) Appl. No.: 09/330,118

(22) Filed: Jun. 10, 1999

(51) Int. Cl.[7] .................................................... G05G 1/14
(52) U.S. Cl. ................................................................ 74/594.1
(58) Field of Search .................................. 74/594.1, 594.7

(56) References Cited

U.S. PATENT DOCUMENTS

| 363,522 | * | 5/1887 | Knous | 74/594.1 |
|---|---|---|---|---|
| 518,456 | * | 4/1894 | Ide | 74/594.1 |
| 1,227,743 | * | 5/1917 | Burgedorff | 74/594.1 |
| 4,850,245 | * | 7/1989 | Feamster | 74/594.1 |
| 4,915,374 | * | 4/1990 | Watkins | 74/594.1 X |
| 5,125,288 | * | 6/1992 | Amiet | 74/594.1 |
| 5,566,589 | * | 10/1996 | Buck | 74/594.1 |
| 5,911,792 | * | 6/1999 | Jaimes | 74/594.1 |

FOREIGN PATENT DOCUMENTS

| 961053 | * | 2/1948 | (FR) | 74/594.1 |
|---|---|---|---|---|
| 2699883 | * | 7/1994 | (FR) | 74/594.1 |

* cited by examiner

*Primary Examiner*—Charles A Marmor
*Assistant Examiner*—Roger Pang
(74) *Attorney, Agent, or Firm*—Galgano & Burke

(57) ABSTRACT

Bicycle cranks which operatively link a pedal to a bicycle sprocket. One embodiment comprises a molded, one-piece support arm connectable to a bicycle sprocket and an extension arm integrally formed with the support arm. A plurality of threaded holes are provided for removably and selectively positioning a pedal on the crank. At least one of the threaded holes is positioned through the extension arm. Alternative embodiments comprise curved cranks.

3 Claims, 5 Drawing Sheets

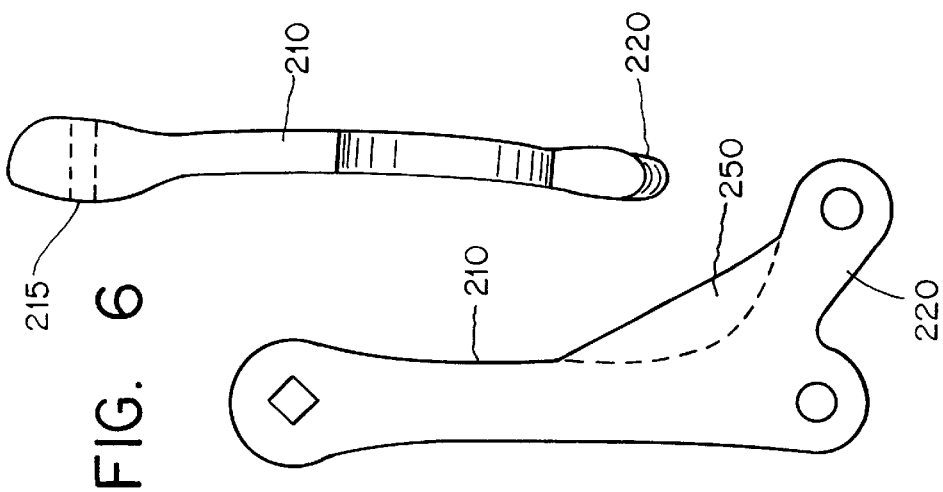
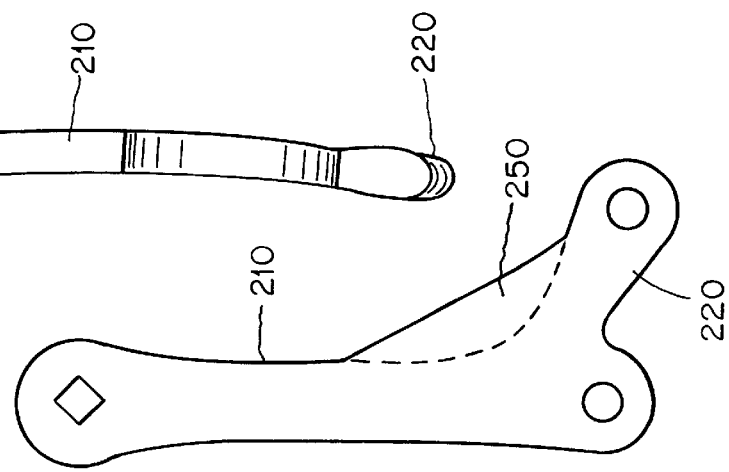
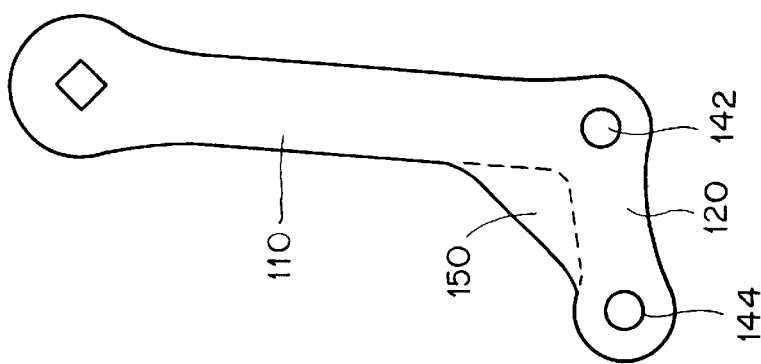
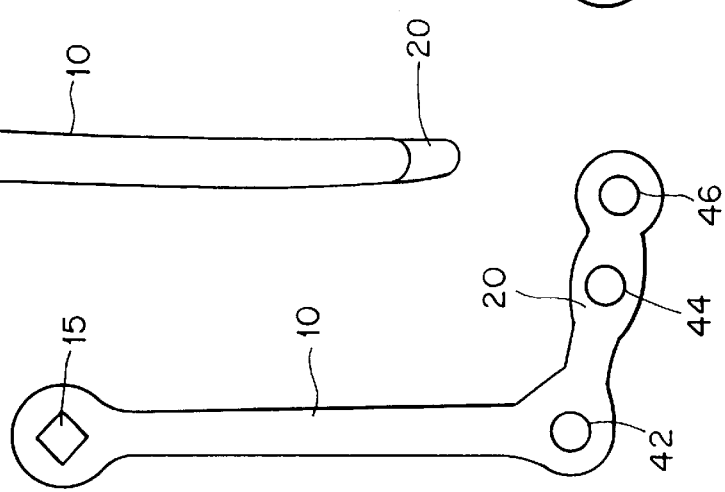
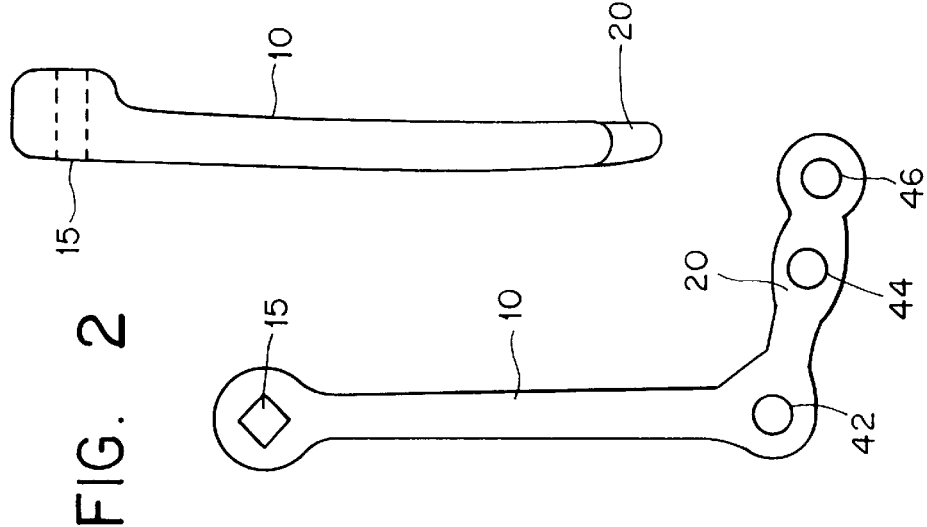

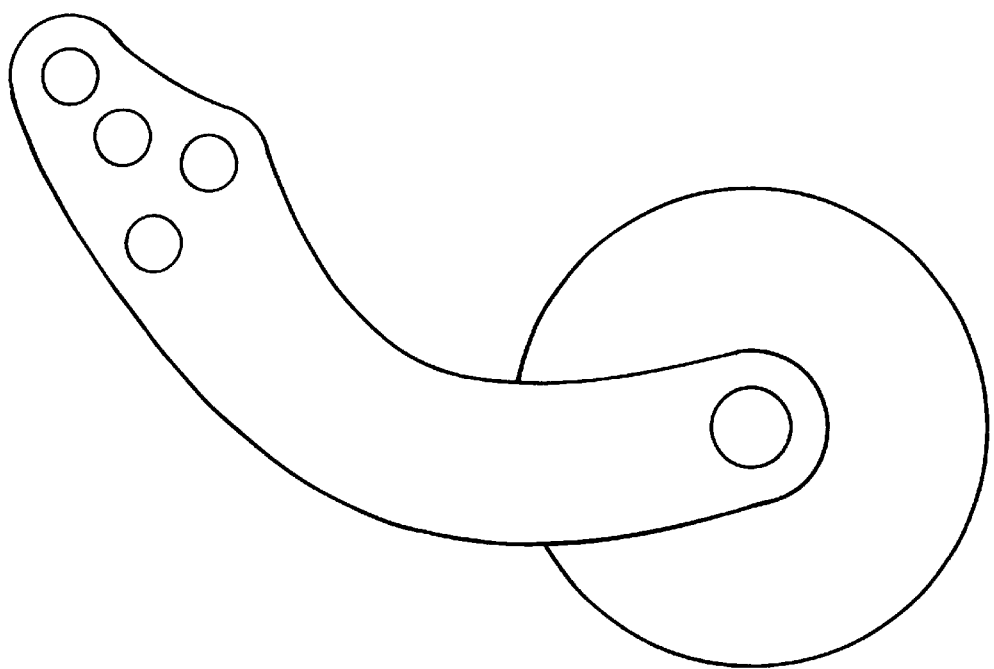
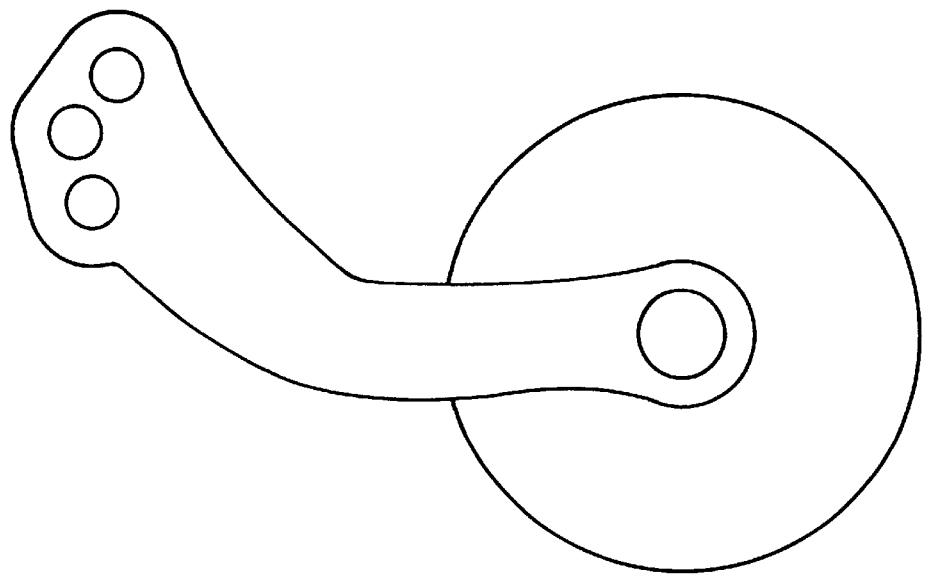

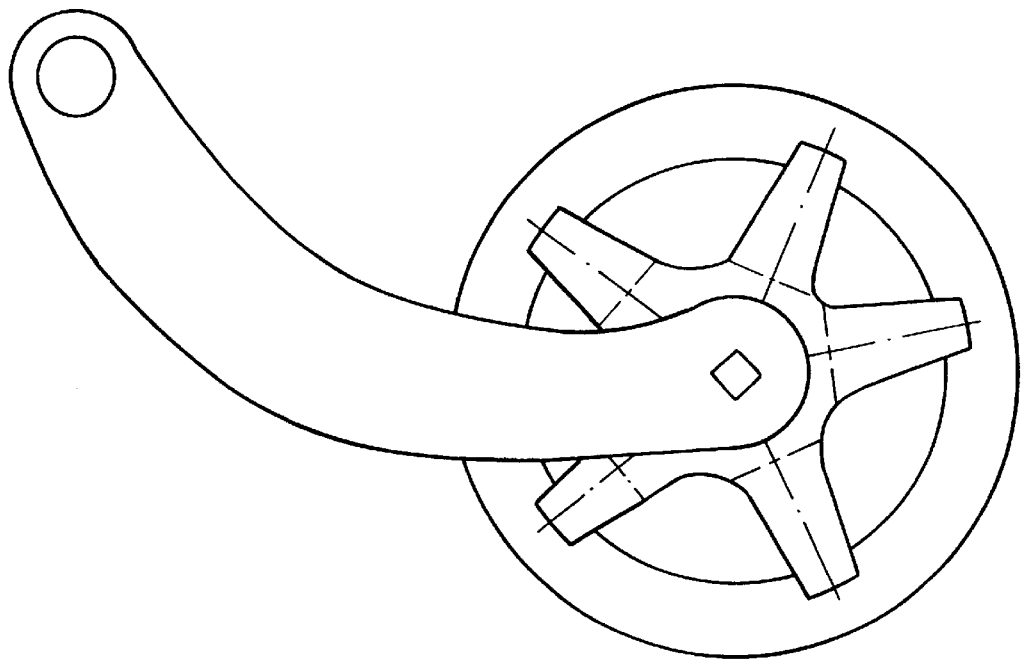
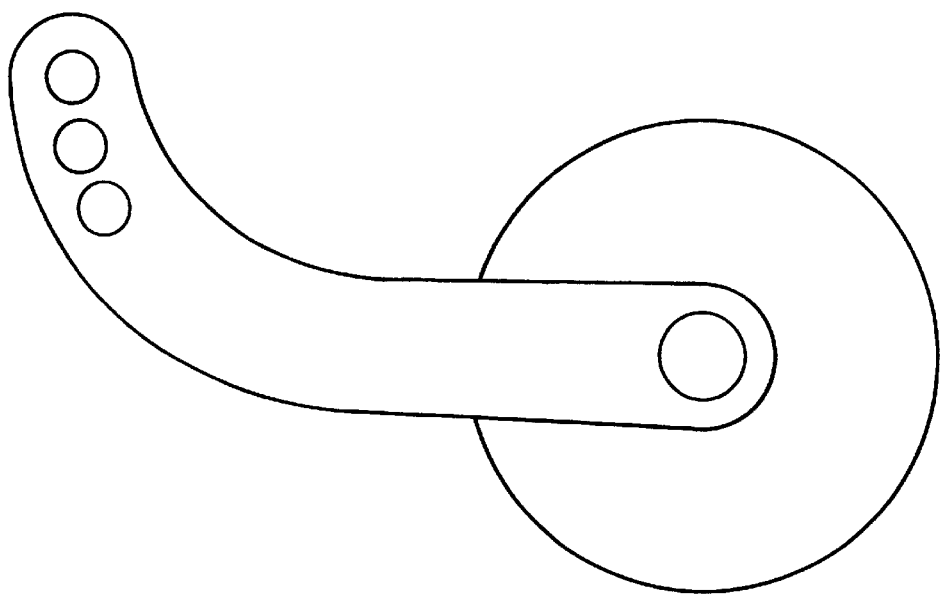

BICYCLE SPROCKET CRANK

BACKGROUND OF THE INVENTION

Bicycles have been enjoyed as a source of transportation and pleasure for well over one hundred years. Over this time period, many adaptations have been made to conform bicycles to specific uses, render their use safer and more comfortable, and to increase the efficiency of the energy applied to the vehicle by the rider. In substantially all bicycles, movement of the bicycle is caused by the rotation of a bicycle crank which is typically connected to a sprocket, which in turn is linked via a chain to a wheel. Rotation of the bicycle crank by the rider's legs causes the sprocket to rotate thereby driving the chain and consequently a wheel.

Those skilled in the art will appreciate that the amount of torque applied by the crank arms is directly related to the distance between the axis about which the crank arm rotates and the position on the crank arm where force is applied by the rider, e.g. the axis about which a bicycle pedal rotates. A number of different devices have been disclosed to permit the adjustment of the bicycle pedal position relative to the axis of rotation of the pedal crank. One disadvantage of many previously disclosed devices is the number of pieces employed. Those familiar with bicycle riding appreciate that there is a significant amount of vibration imparted to the entire bicycle during riding. Therefore, it is desirable to minimize the number of connections which may be loosened due to vibrations.

It would therefore be desirable to provide a simple, one-piece bicycle crank which permits the angle of torque application and the actual torque applied to a bicycle crank to be arranged in a manner which is simple and which does not sacrifice or detract from the strength of the crank.

It would also be desirable to provide a bicycle crank which tends to decrease the "dead zone", i.e. when one pedal is around the 12 o'clock position and the opposite pedal is around the 6 o'clock position.

SUMMARY OF THE INVENTION

The various embodiments of the present invention are directed to bicycle cranks which operatively link a pedal to a bicycle sprocket. One preferred embodiment of the present invention comprises a support arm having a first end portion and a second end portion, the first end is connectable to a bicycle sprocket while an extension arm integrally formed with the support arm extends from a position proximate the second end portion at an interior angle of about 100 degrees to about 175 degrees.

Other preferred embodiments comprise curved bicycle cranks.

A plurality of threaded holes are preferably provided for removably and selectively positioning a pedal on the crank. At least one of the threaded holes is positioned through the extension arm.

Embodiments of the present invention comprise different numbers of threaded holes or other devices for selectively connecting a pedal to the extension arm.

BRIEF DESCRIPTION OF THE DRAWINGS

FIGS. 2 and 3 are side and end views, respectively, of the embodiment shown in FIG. 1.

FIGS. 4 and 5 are side and end views of another embodiment of the present invention.

FIGS. 6 and 7 are side and edge views, respectively, of still another embodiment of the present invention.

FIGS. 8–13 illustrate alternative embodiments of the present invention comprising curved cranks.

DETAILED DESCRIPTION

Figure 1:
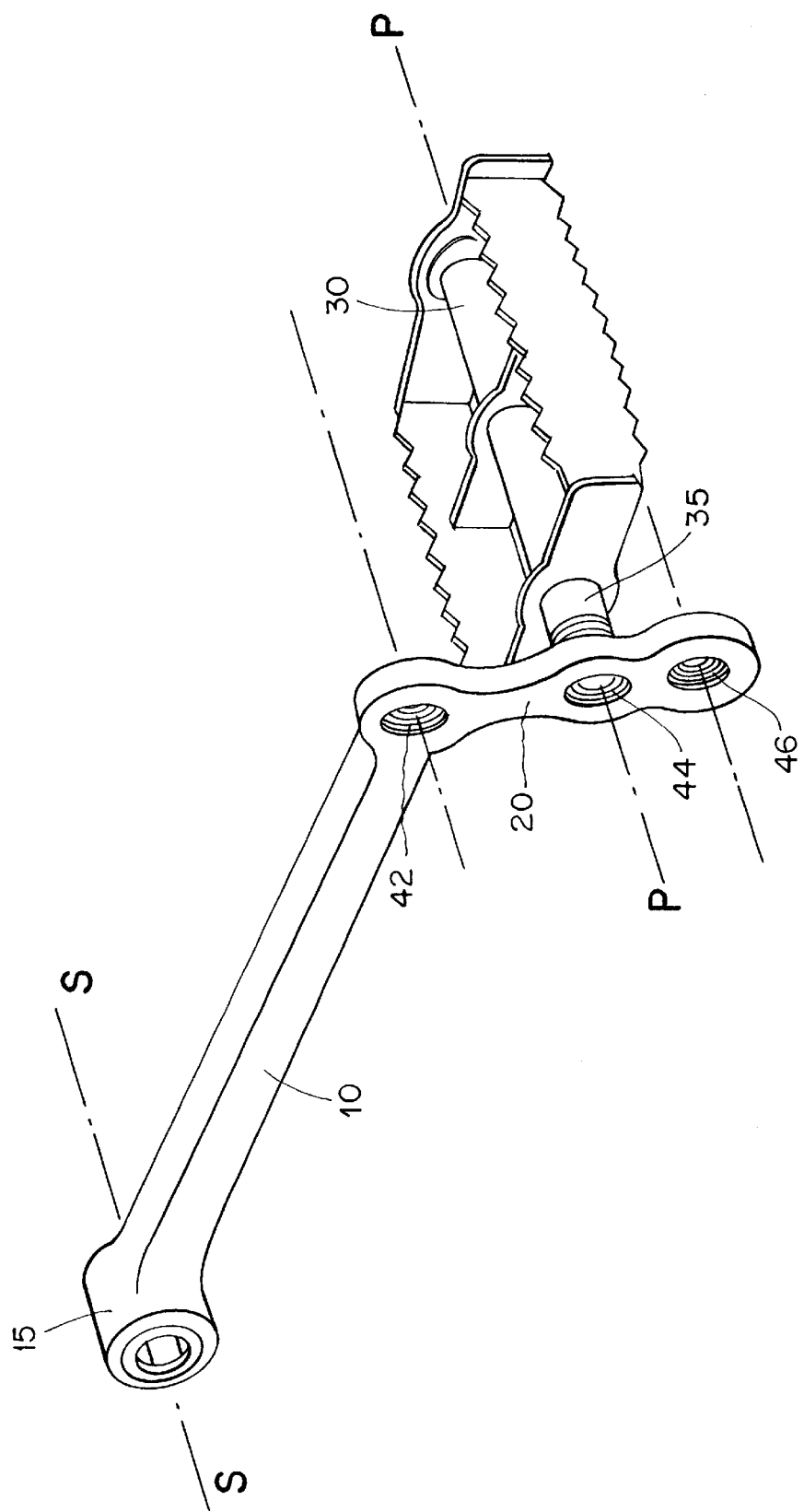
FIG. 1 is a perspective view of one embodiment of the present invention.

The various embodiments of the present invention comprise one-piece bicycle cranks comprising an integral support arm and extension arm. With reference to the embodiment illustrated in FIG. 1, a support arm 10 is integrally formed with an extension arm 20. One end of the support arm is designed to be connected to a bicycle sprocket or the axle of a bicycle sprocket. In the embodiment illustrated in FIG. 1, this end is illustrated as connection end 15. While the figures illustrate one form of connection end on each of the illustrated bicycle cranks, other forms of connection may be utilized without departing from the scope of the present invention. In the embodiment illustrated in FIG. 1, the extension arm 20 is provided with a plurality of threaded holes designed to receive the threaded axle of a pedal. The form of the pedal 30 is also merely for purposes of illustration since other forms of pedals may be utilized. The illustrated pedal advantageously comprises a threaded axle 35 which is disposed along axis P—P. As illustrated, a plurality of threaded holes designated 42, 44 and 46 are provided for the quick, secure and selective attachment of pedal 30 to the crank. In the embodiment illustrated in FIG. 1, two holes are located in the extension arm 20 and hole 42 is located at the juncture of the support arm and extension arm 20. The present invention provides a rider with the ability to quickly and securely change the distance between the points where force is applied to the crank, i.e., axis P—P, and the axis of rotation of the sprocket denoted as S—S in FIG. 1. FIGS. 2 and 3 are side and end view respectively of the bicycle crank illustrated in FIG. 1. Another preferred aspect of the present invention is illustrated in the embodiment shown in FIGS. 4 and 5. In this embodiment, which comprises two threaded holes 142, 144 for receiving a pedal (not shown), a substantial reinforcement portion 150 is formed between support arm 110 and extension arm 120. Since the support arms and extension arms of the various embodiments of the present invention are integrally formed, the present invention permits the use of an integral reinforcement section to add further strength to the bicycle crank. This embodiment also illustrates that a present invention may be utilized with any reasonable number of threaded holes for receiving the threaded axle of a pedal. Moreover, if desired, the present invention permits a bicycle rider to set one pedal in one hole while the opposite pedal be placed in a non-corresponding hole on the opposite crank. While this may feel awkward and unbalanced for riders, the present invention offers an advantage without sacrificing the strength of the connection between the pedal and the sprocket axle.

A still further embodiment of the present invention is illustrated in FIGS. 6 and 7 wherein the support arm 210 is integrally formed with extension arm 220. A reinforcement section 250 is provided for additional strength. In this embodiment, extension arm 220 extends the portion of support arm 210 which is proximate but not specifically located at the very end of support arm 210. According to another aspect of this invention, best shown in FIG. 7, the support arm 210, in the portion between connection end 215 and extension arm 220 is curved.

Therefore, from the present description, it will be understood that embodiments of the present invention provides various bicycle cranks which permit the ready attachment of a pedal at different relative distances and angles to the support arm of a bicycle crank without sacrificing the strength of the connection between the pedal and the bicycle sprocket.

Alternative embodiments of the present invention are illustrated in FIGS. 8–13. Each of these embodiments comprise a generally curved bicycle crank and at least one hole for connecting to a pedal. In the embodiment illustrated in FIG. 8, the bicycle crank advantageously comprises three holes for selectively positioning a bicycle crank at different distances and angles relative to the lower portion of the elongated body of the bicycle to crank. The plurality of holes in this embodiment are arranged generally along an arc.

Figure 9:
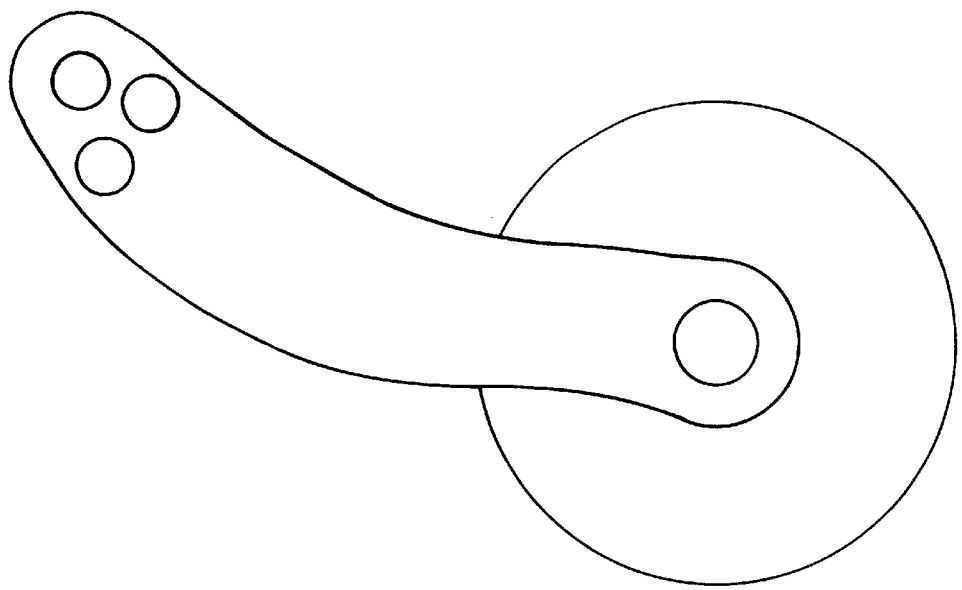
Figure 8:
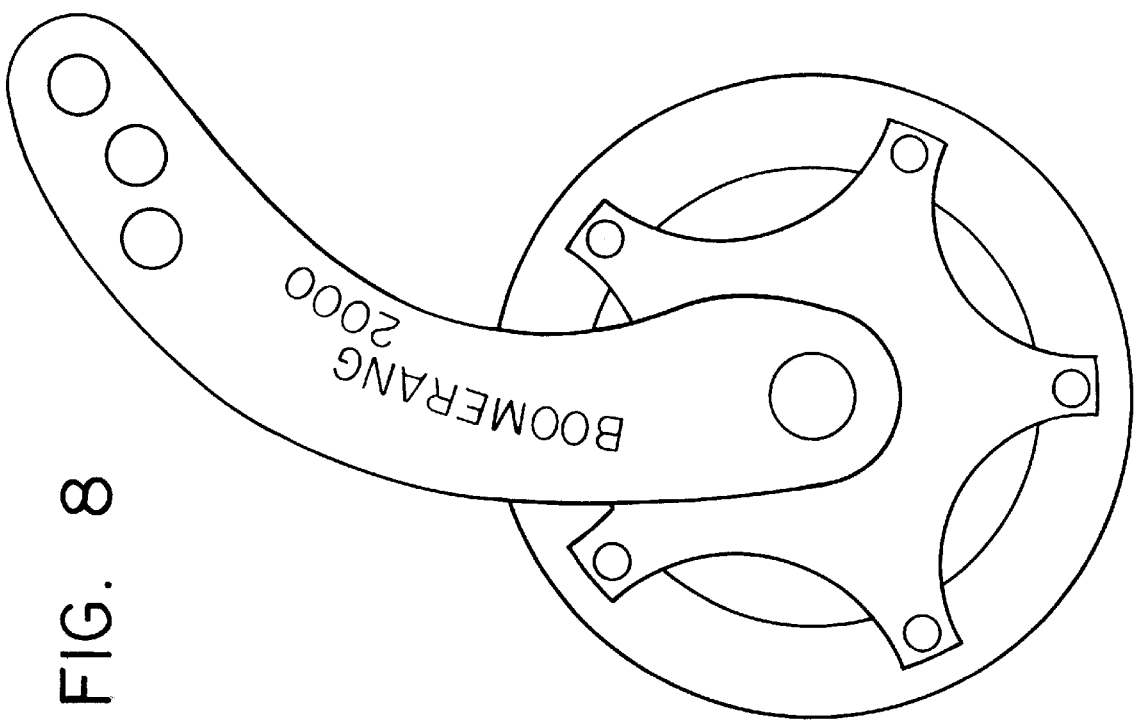

FIG. 9 illustrates another embodiment wherein a curved bicycle crank comprises three holes for receiving the threaded shaft of a pedal. The holes in the embodiment of FIG. 9 are generally arranged in a triangular fashion. The embodiment illustrated in FIG. 10 also comprises a plurality of holes arranged generally along an arc. This embodiment comprises an upper or distal end which is substantially wider than the end of the crank which connects to the bicycle sprocket.

It is also within the scope of the present invention to provide a curved bicycle crank comprising more or less than three holes. As shown in FIG. 11, the bicycle crank comprises four holes which are adapted to receive a bicycle pedal. The embodiment illustrated in FIG. 12 comprises three holes arranged in a generally linear fashion, while the embodiment illustrated in FIG. 13 comprises a curved bicycle crank having only one hole.

What is claimed is:

1. A one-piece bicycle crank for operatively linking a pedal to a bicycle sprocket comprising:

a curved, elongated body comprising a first end portion connectable to a bicycle sprocket and a second end portion connectable to a pedal;

said second end portion comprises a plurality of threaded holes for connecting to a pedal; wherein said holes are arranged generally along an arc.

2. A one-piece bicycle crank according to claim 1 comprising at least three threaded holes.

3. A one-piece bicycle crank according to claim 1 wherein one threaded hole is positioned proximate said second end portion.

* * * * *